(12) United States Patent
Plesh, Sr.

(10) Patent No.: US 6,494,622 B2
(45) Date of Patent: Dec. 17, 2002

(54) BEARING WHEEL FOR CONVEYORS AND THE LIKE

(76) Inventor: Ronald L. Plesh, Sr., 31 Hemlock Hill, Orchard Park, NY (US) 14127

( * ) Notice: Subject to any disclaimer, the term of this patent is extended or adjusted under 35 U.S.C. 154(b) by 14 days.

(21) Appl. No.: 09/732,517

(22) Filed: Dec. 6, 2000

(65) Prior Publication Data

US 2001/0031106 A1 Oct. 18, 2001

Related U.S. Application Data

(60) Provisional application No. 60/169,117, filed on Dec. 6, 1999.

(51) Int. Cl.[7] ............................................. F16C 43/00
(52) U.S. Cl. ........................ 384/542; 384/543; 384/906
(58) Field of Search ........................... 384/58, 449, 416, 384/418, 537, 542, 543, 544, 546, 586, 587, 906

(56) References Cited

U.S. PATENT DOCUMENTS

| | | | |
|---|---|---|---|
| 830,100 A | * | 9/1906 | Post ............................ 384/586 |
| 1,893,574 A | | 1/1933 | Anderson |
| 3,086,826 A | * | 4/1963 | Gunnell ....................... 384/418 |
| 3,602,150 A | | 8/1971 | Frost et al. |
| 3,951,076 A | | 4/1976 | Knudsen et al. |
| 3,953,141 A | * | 4/1976 | Koch ............................ 384/542 |
| 4,367,905 A | | 1/1983 | Nauta |
| 4,502,738 A | | 3/1985 | Nauta |
| 4,798,149 A | | 1/1989 | Hoffmann |
| 5,178,472 A | | 1/1993 | Lawson |
| 5,398,618 A | | 3/1995 | McMullen |
| 5,676,468 A | * | 10/1997 | Webb ........................... 384/906 |

FOREIGN PATENT DOCUMENTS

GB 0000566 * 1/1896 ................. 384/544

* cited by examiner

*Primary Examiner*—Jack Lavinder
*Assistant Examiner*—Thomas J. Williams
(74) *Attorney, Agent, or Firm*—James C. Simmons

(57) ABSTRACT

A reliable bearing wheel assembly comprising a shaft, an inner race, an outer race, and rollers or other bearing elements between the inner and outer races, wherein the inner race is reliably prevented from both rotating and moving axially relative to the shaft, even when there is bearing failure. A first pair of axially extending grooves are provided in the outer surface of an end portion of the shaft and in the inner surface of the inner race respectively which in combination define a first keyway. A second pair of axially extending grooves are provided in the outer surface of the shaft end portion and in the inner surface of the inner race respectively which in combination define a second keyway. A first key is received in the first keyway. A fastener having a threaded shank portion threadedly engages a threaded bore which extends axially in the shaft end portion. A head portion of the fastener engages the inner race and at least partially covers the first keyway to block escape of the first key therefrom. A second key is received in the second keyway, and a portion thereof extends axially outwardly of the second keyway and abuts the head portion to prevent turning of the fastener to prevent loosening thereof as well as to prevent uncovering of the first keyway and escape of the first key therefrom.

14 Claims, 1 Drawing Sheet

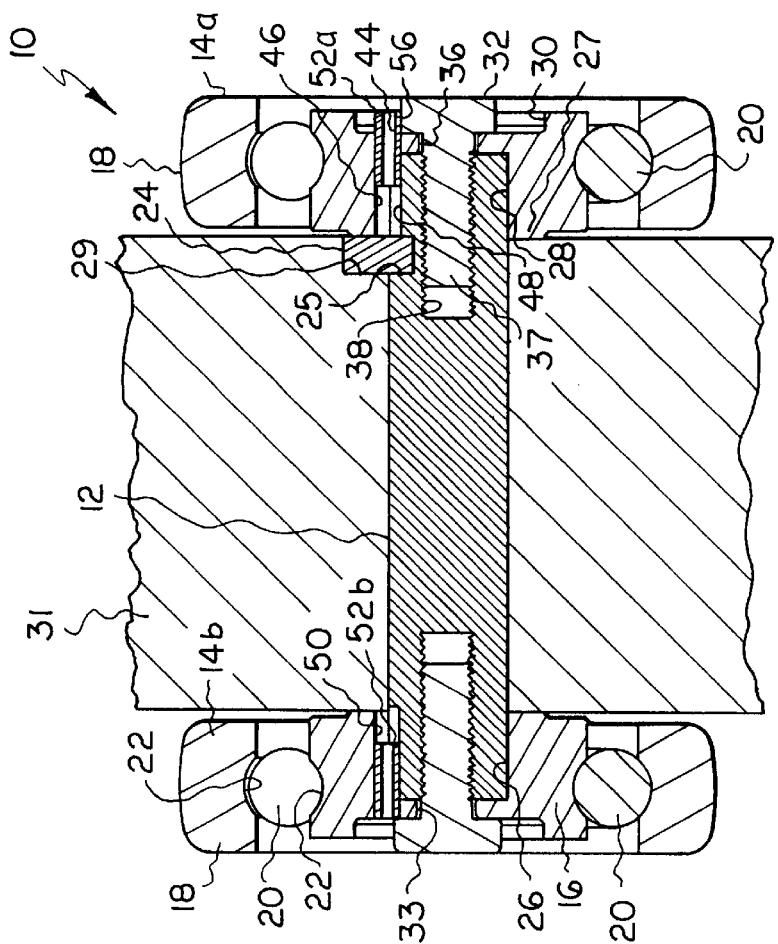
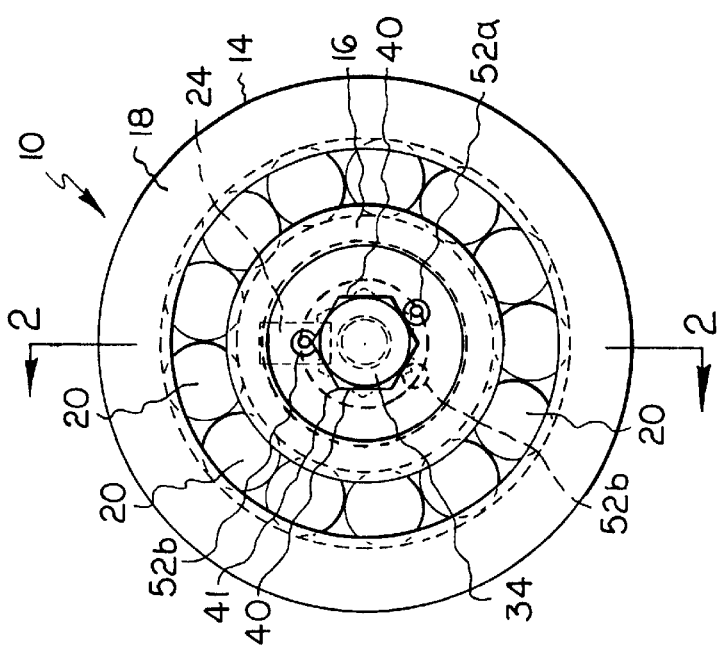
FIG. 2
FIG. 1

BEARING WHEEL FOR CONVEYORS AND THE LIKE

Priority of provisional U.S. patent application Ser. No. 60/169,117, filed Dec. 6, 1999, the disclosure of which is incorporated herein by reference, is hereby claimed.

The present invention relates generally to bearing wheels for use in conveyor systems and the like.

Bearing wheels in conveyor systems typically comprise an axle to which the inner race of a ball or sleeve bearing is fixedly attached. The outer race rotates to act as a wheel. The inner race has been conventionally riveted to the axle, which disadvantageously requires that the axle be destroyed to get the wheel off. Moreover, when the wheel begins to wear out, it becomes stiff and the outer race stops rotating. As a result, the inner race starts rotating on the axle and wearing the rivet away until the wheel falls off, requiring a shut-down of the conveyor system and associated equipment. It is important to the operator not to have to shut down the system since such down-time is very expensive. The operator would therefore prefer to have a warning of wheel failure so that repairs can be made at a convenient time to avoid such a costly shut-down.

U.S. Pat. No. 3,602,150 discloses a suspended trolley construction for a power-and-free conveyor system, wherein a central casting is supported by a shaft to which wheels are attached to the shaft ends, the wheels rotatable along rails. Each wheel has an inner race and an outer race separated by bearings. The inner race is removably fixed to the shaft by an end plug which threadedly engages the end of the shaft and which has an expanded head which bears against an annular bevel of the inner race. A slot is milled longitudinally along a side of the shaft and is engaged by a radially inwardly projecting lug of the inner race to key the inner race to the shaft and thus prevent relative rotation between the shaft and inner race.

Undesirably, the screws holding the inner races on the axle of this U.S. Pat. No. 3,602,150 may loosen to cause the wheels to come apart. In addition, the radially extending lug, with its small cross-sectional area subject to shear, would undoubtedly not have as much strength as desired for preventing the inner race from rotating relative to the axle under the wheel failure conditions described above.

U.S. Pat. Nos. 4,367,905; 4,502,738; and 5,178,472 disclose a multi-sided (non-circular) shaft upon which an inner race of a bearing or bearing wheel is mounted to prevent relative rotation therebetween. U.S. Pat. No. 4,798,149 may also be of interest.

U.S. Pat. No. 3,951,076 discloses a trolley comprising a trolley body, a shaft, and a wheel on each end of the shaft. The wheel comprises an inner race having an opening through which the shaft extends, an outer race, and rollers between the inner and outer races. A cap screw is threadedly engaged in an axially extending opening in an end of the shaft, and its cap bears against a conical washer which in turn bears against a frusto conical surface of the inner race to retain the inner race on the shaft. The screw has threads which are shaped to lock against the threads in the shaft opening in order to lock the screw against rotation thereof.

In the trolley construction of this U.S. Pat. 3,951,076, no means are disclosed for preventing rotation of the inner race relative to the shaft.

It is accordingly an object of the present invention to reliably provide an early warning (before the wheel falls off) that a bearing wheel has failed.

It is another object of the present invention to provide such a bearing wheel which may be disassembled (without destroying the wheel and/or axle) and repaired.

It is a further object of the present invention to provide such a bearing wheel which is reliable, i.e., it reliably prevents rotation of the inner race relative to the shaft on which it is mounted even under conditions of bearing failure as described above, and it reliably prevents axial movement of the inner race relative to the shaft.

It is yet another object of the present invention to provide such a bearing wheel which is rugged and inexpensive.

In order to provide such a bearing wheel, in accordance with the present invention, the inner race is held on the axle by a key or other suitable means for preventing rotation of the inner race on the axle and by a screw or other suitable means for preventing axial movement of the inner race relative to the axle. The screw is prevented from rotation by a key or other suitable means.

The above and other objects, features, and advantages of the present invention will be apparent in the following detailed description of the preferred embodiment of the invention when read in conjunction with the accompanying drawings wherein the same reference numerals denote the same or similar parts throughout the several views.

BRIEF DESCRIPTION OF THE DRAWINGS

FIG. 1 is side elevation view of a double bearing wheel which embodies the present invention.

FIG. 2 is a section view thereof taken along lines 2—2 of FIG. 1.

DETAILED DESCRIPTION OF THE PREFERRED EMBODIMENT

Referring to the drawings, there is shown generally at 10 a double bearing wheel assembly for use in a conveyor system or in other suitable applications. The double bearing wheel assembly 10 includes an elongate axle or shaft 12 to which a pair of identical bearing or trolley wheels 14 are attached, as hereinafter described, at the opposite ends thereof. It should however be understood that this invention does not require that there be two bearing wheels on the axle, but the present invention may be embodied in a single bearing wheel or even more than two bearing wheels mounted on an axle.

Each bearing wheel 14 includes an inner circumferential (ring-shaped) race 16 fixedly attached to an end of the axle 12 as described hereinafter, an outer circumferential (ring-shaped) race 18, and a plurality of balls 20 or rollers or other suitable bearing means such as a sleeve bearing which allows rotational movement of the outer race 18 relative to the inner race 16. Thus, as is conventional in the ball bearing art, indents, illustrated at 22, are provided in the outer surface of the inner race 16 and in the inner surface of the outer race 18 for rotatably receiving the balls 20 respectively therebetween. The bearing means is suitably and conventionally lubricated in accordance with principles commonly known to those of ordinary skill in the art to which this invention pertains.

Unless otherwise specified, all parts of the double bearing wheel 10 are made of steel or other suitable material. The inner and outer raceways 16 and 18 respectively are preferably hardened then finish machined for improved accuracy and bearing life.

For purposes of illustration and not limitation, the following are exemplary dimensions of the bearing wheel assembly. For example, the overall length of the bearing wheel assembly may be about 7.402 inches, the distance between the bearing wheels may be about 4.656 inches, the width of each bearing wheel may be about 1.312 inch with the width of the inner race increased on its axially inner side near its radially inner surface by about 0.040 inch to define an enlarged portion 27, the shaft diameter may be about 1.125 inch, and the outer race diameter may be about 5.125 inches.

A hardened dowel pin 24 is tightly received in a slot 25 in the circumferential surface of the axle 12 (adjacent the axially inner surface of the enlarged portion 27 of the inner race 16 of one of the bearing wheels and extending radially outwardly beyond the enlarged portion 27) and tightly received in a like slot 29 in the associated conveyor casting 31 (or other suitable means is provided) to prevent rotation of the axle 12 relative to the conveyor casting 31. The dowel pin 24 may, for example, have a diameter of about ⅜ inch and a length of about ¾ inch.

The inner race 16 has a radially centrally disposed bore, illustrated at 26, extending axially therethrough. The axially inner portion, illustrated at 28, (over most of the length, perhaps about ⅔ of bore 26) of the bore 26 is enlarged to tightly receive the respective end of the axle 12, and the axially outer portion, illustrated at 30, of the bore 26 is also enlarged to receive the head 32 of a screw 34. As a result, a radially inwardly extending protrusion or ridge abutment 36 is defined between the bore portions 28 and 30 the inner diameter of which is sized to receive the shank 37 of the screw 34. The respective end of the axle 12 has a threaded aperture, illustrated at 38, extending axially into the axle 12 from its respective end. In order to prevent the axle from moving axially relative to the inner race 16 and to provide a positive wheel to axle connection for increased joint life and ease of maintenance, in accordance with a preferred embodiment of the present invention, the respective end of the axle 12 is inserted into the axially inner bore portion 28 to abut against the ridge 36, and the screw shank 37 is inserted through the axially outer bore portion 33 of the ridge 36 and threadedly received in threaded aperture 38 and tightened so that the screw head 32 abuts the ridge 36 and its axially outer surface is flush with the axially outer surface of the axially outer race 14. The screw 34 is, for example, about 1½ inch long and has a diameter, for example, of about ½ inch. The screw head 32 is preferably polygon-shaped thusly having a plurality of faces or sides 40 each pair of which converges to define an apex portion 41. More preferably, the screw head 32 is of the well known hex type, i.e., shaped to have 6 sides or faces 40 each covering about 60 degrees of arc. However, the screw head 32 may have a greater or lesser number of faces or be otherwise suitably shaped. For example, the screw 34 may be a flat-head screw.

If the inner race were merely riveted to the axle as is conventional in the art and if the inner and outer races were to seize up so that the outer race could not rotate relative to the inner race, the inner race would begin wearing the rivet away and may begin rotating on the axle until it, without warning, fell off, requiring an expensive shut-down of conveyor equipment for repairs. In accordance with the present invention, means is provided for preventing such rotation from occurring. In accordance with a preferred embodiment of such means, a pair of holes, illustrated at 44, are provided in the radially outer portion of the ridge 36, and a half circular channel or groove, illustrated at 46, extends in the radially inner surface of the inner race from each hole 44 axially to and through the axially inner surface of the inner race 16. A corresponding half circular channel or groove, illustrated at 48, extends in the radially outer surface of the axle from the respective axle end axially inwardly over substantially the same distance that channel 46 extends. The grooves 46 and 48 are suitably positioned so that, by rotating the inner race 16 relative to the axle 12, these half channels 46 and 48 respectively may be lined up to form together a circular aperture which with the respective hole 44 forms a keyway 50. In order to prevent the inner race 16 from rotating relative to the axle 12, in accordance with a preferred embodiment of the present invention, a spring pin 52 or dowel or other suitable pin or key is inserted in each keyway 50, including the respective half channels 46 and 48, to lockingly fix the inner race 16 to the axle 12 so that neither can rotate relative to the other.

The insertion of a key radially to key the inner race to the axle provides only a small cross sectional area (height times width of the key) to resist shear forces, which may be adequate during normal bearing operation but which may be inadequate to resist the high shear forces which are encountered when the inner race seizes on the axle during bearing failure. The insertion of the key 52 axially provides a large cross sectional area (length times width of the key) to adequately resist the high shear forces which are encountered when the inner race seizes on the axle during bearing failure and thus prevent relative rotation between the axle and inner race even under such extreme conditions.

In order to prevent the screw 34 from rotating and working loose, preferably one of the spring pins 52 or keys for each bearing wheel, as seen by spring pin 52a for bearing wheel 14a, is inserted in the respective keyway 50 so that a portion 56 thereof extends axially outwardly from the keyway 50 to lie adjacent or abut a face 40 of the screw head 32. The other spring pin 52 for each bearing wheel, as seen by spring pin 52b for bearing wheel 14b, is driven into the keyway 50 so that its axially outer end surface is flush with the axially outer surface of ridge 36 so as to be out of the way of the screw head 32 when the screw 34 is inserted. In order to cause the screw head 32 to cover or partially cover the opening to the hole 44 to insure that key 52b remains in the keyway 50 while allowing the key 52a to abut or lie adjacent one of the screw head faces 40 with the keyways preferably disposed on generally diametrically opposed sides of the inner race 16, the keyways 50 for the six-face screw head 32 are spaced apart circumferentially preferably about 150 degrees, for reasons that will become apparent hereinafter. Each of the spring pins 52 may, for example, have a diameter of about ¼ inch and a length of about ¾ inch. It should be understood that each bearing wheel 14a and 14b is connected to the axle 12 by both a key 52a and a key 52b. It should be however understood that the present invention is not limited to two such keyways, but one or more than two such keyways 50 may be provided for each bearing wheel.

In order to assemble a bearing wheel 14 on the axle 12, in accordance with a preferred embodiment of the present invention, the respective end of the axle is received in the inner race 16, and the inner race is rotated until channels 46 and 48 are lined up to form keyways 50. A key 52b is then inserted and driven into a keyway 50 so that its axially outer surface is flush with the axially outer surface of the ridge 36, as illustrated in bearing wheel 14b, so as to lockingly fix the inner race to the axle against rotation therebetween yet be out of the way of the screw head 32 when the screw 34 is inserted. The screw 34 is then inserted to threadedly engage threaded axle aperture 38 and tightened with the screw head positioned so that an apex portion 41 (which extends radially of the screw outwardly of the center of a face 40) covers the opening to the hole 44 in which is received the inserted key 52b to prevent it from escaping or coming out of the keyway 50 while at the same time thereby allowing entrance of a key 52a to the other keyway 50. The other key 52a is then inserted in the other keyway 50 so as to lie adjacent or abut a screw head face 40, i.e., in a position as illustrated for bearing wheel 14a with the portion 56 protruding axially outwardly from the hole 44.

In order to remove the bearing wheel, the key 52a is driven entirely into the keyway 50, similarly as key 52b is driven, so that its axially outer face is flush with the axially outer face of the ridge 36 thereby clearing the screw head 32 so that the screw 34 may be turned. The screw 32 may then be unscrewed and removed after which the inner race 16 may be pulled axially off of the axle 12.

It should be understood that other suitable means may be provided to prevent rotational movement of the inner race relative to the axle, such as, for example, a spline having a hex or other suitable shape, detents in one of the inner race or the axle into which deformed metal from the other of the inner race or the axle is caused to flow, machining the axle and the inner race on one end of the axle as a single piece, and positioning of the screw 32 and the receiving opening 38 for the screw parallel to but offset from the axle centerline whereby rotation of the inner race 16 is prevented due to the screw assuming a shear state. Such means are meant to come within the scope of the present invention.

It should also be understood that other suitable means may be provided to prevent axial movement of the inner race relative to the axle, such as, for example, deforming of the metal as discussed above, a snap ring, extending the inner race and inserting a radial pin or inserting a suitable threaded nut, and machining the axle and the inner race on one end of the axle as a single piece. Such means are meant to come within the scope of the present invention.

When the bearing wheel locks up so that the outer race ceases to rotate relative to the inner race, the inner race may seize on the axle but, unlike riveted bearing wheels of the prior art, will not rotate on the axle, and the axially inserted keys afford strength to resist the high shear forces, even during such extreme conditions as bearing failure. The bearing wheel as a result stops turning, which as a result advantageously provides a warning to the conveyor system operator so that expensive unscheduled down-time may be avoided. Moreover, the locking of the fastener position is provided to prevent loosening of the fastener so that the bearing wheel does not come part. The present invention is thus provided to provide a bearing wheel which is reliable, even under the extreme conditions of bearing failure, as well as inexpensive and allows the bearing wheel to be easily disassembled from the axle for replacement.

It should be understood that, while the present invention has been described in detail herein, the invention can be embodied otherwise without departing from the principles thereof, and such other embodiments are meant to come within the present invention as defined by the appended claims.

What is claimed is:

1. A bearing wheel assembly comprising a shaft, an inner race mounted on said shaft, an outer race, bearing means between said inner and outer races, means for preventing rotation of said inner race relative to said shaft, means for preventing movement axially of said inner race relative to said shaft, and means for preventing loosening of said axial movement preventing means, wherein said shaft includes an end portion having a radially outer surface, said inner race has a radially inner surface, said rotation preventing means comprises means defining a pair of axially extending grooves in said shaft end portion outer surface and in said inner race inner surface respectively which in combination define a keyway, and a key receivable in said keyway, the assembly further comprising means for covering said keyway to prevent escape of said key therefrom, wherein said axial movement preventing means comprises a fastener and said keyway covering means comprises a head portion of said fastener, and wherein said loosening preventing means comprises means defining an other pair of axially extending grooves in said shaft end portion outer surface and in said inner race inner surface respectively which in combination define an other keyway, and an other key received in said other keyway and which abuts said head portion to prevent turning thereof.

2. An assembly according to claim 1 wherein said head portion is shaped to have a plurality of faces each pair of which converges to define an apex portion, one of said apex portions covering said keyway and said other key abutting one of said faces.

3. A bearing wheel assembly comprising a shaft, an inner race mounted on said shaft, an outer race, bearing means between said inner and outer races, means for preventing rotation of said inner race relative to said shaft, means for preventing movement axially of said inner race relative to said shaft, and means for preventing loosening of said axial movement preventing means, wherein said axial movement preventing means comprises a fastener having a head portion, said shaft includes an end portion having a radially outer surface, said inner race has a radially inner surface, said loosening preventing means comprises means defining a pair of axially extending grooves in said shaft end portion outer surface and said inner race inner surface respectively which in combination define a keyway, and a key received in said keyway and which has a portion which extends from said keyway and abuts said head portion to prevent turning thereof.

4. An assembly according to claim 3 wherein said head portion is shaped to have a plurality of faces and said key abutting one of said faces.

5. A bearing wheel assembly comprising a shaft including an end portion having a radially outer surface, an inner race having a radially inner surface, an outer race, bearing means between said inner and outer races, means defining a pair of axially extending grooves in said shaft end portion outer surface and in said inner race inner surface respectively which in combination define a keyway, an axially extending threaded bore in said shaft end portion, a fastener having a threaded shank portion which threadedly engages said threaded bore and a head portion which engages said inner race to fix said inner race axially on said shaft, and a key received in said keyway and which has a portion which extends from said keyway and abuts said head portion to prevent loosening of said fastener.

6. An assembly according to claim 5 wherein said head portion is shaped to have a plurality of faces and said key abutting one of said faces.

7. A bearing wheel assembly comprising a shaft including an end portion having a radially outer surface, an inner race having a radially inner surface, an outer race, bearing means between said inner and outer races, means defining a pair of axially extending grooves in said shaft end portion outer surface and said inner race inner surface respectively which in combination define a keyway, an axially extending threaded bore in said shaft end portion, a key received in said keyway, a fastener having a threaded shank portion which threadedly engages said threaded bore and a head portion which engages said inner race and which at least partially covers said keyway to block escape of said key therefrom.

8. An assembly according to claim 7 further comprising means for preventing turning of said fastener.

9. A bearing wheel assembly comprising a shaft including an end portion having a radially outer surface, an inner race having a radially inner surface, an outer race, bearing means between said inner and outer races, means defining a first pair of axially extending grooves in said shaft end portion outer surface and said inner race inner surface respectively which in combination define a first keyway, means defining a second pair of axially extending grooves in said shaft end portion outer surface and said inner race inner surface respectively which in combination define a second keyway, an axially extending threaded bore in said shaft end portion, a first key received in said first keyway, a fastener having a threaded shank portion which threadedly engages said threaded bore and a head portion which engages said inner race and which at least partially covers said first keyway to block escape of said first key therefrom, and a second key received in said second keyway and which abuts said head portion to prevent turning of said fastener.

10. An assembly according to claim 9 wherein said head portion is shaped to have a plurality of faces each pair of which converges to define an apex portion, one of said apex portions covering said first keyway and said second key having a portion which extends from said second keyway and which abuts one of said faces.

11. An assembly according to claim 10 wherein said fastener is a hex-head screw.

12. An assembly according to claim 9 wherein said inner race has a circumferentially extending ridge portion on said inner surface thereof, said end portion of said shaft abuts said ridge portion on one side thereof and said head portion of said fastener abuts said ridge portion on an other side thereof to fix the position axially of said inner race on said shaft, said ridge portion having means defining a pair of apertures therein, said first and second keys received in said aperture means respectively.

13. An assembly according to claim 12 wherein said head portion is shaped to have a plurality of faces each pair of which converges to define an apex portion, one of said apex portions covering said first keyway and said second key having a portion which extends from said second keyway and which abuts one of said faces.

14. An assembly according to claim 9 wherein at least one of said keys is a spring pin.

* * * * *